UNITED STATES PATENT OFFICE.

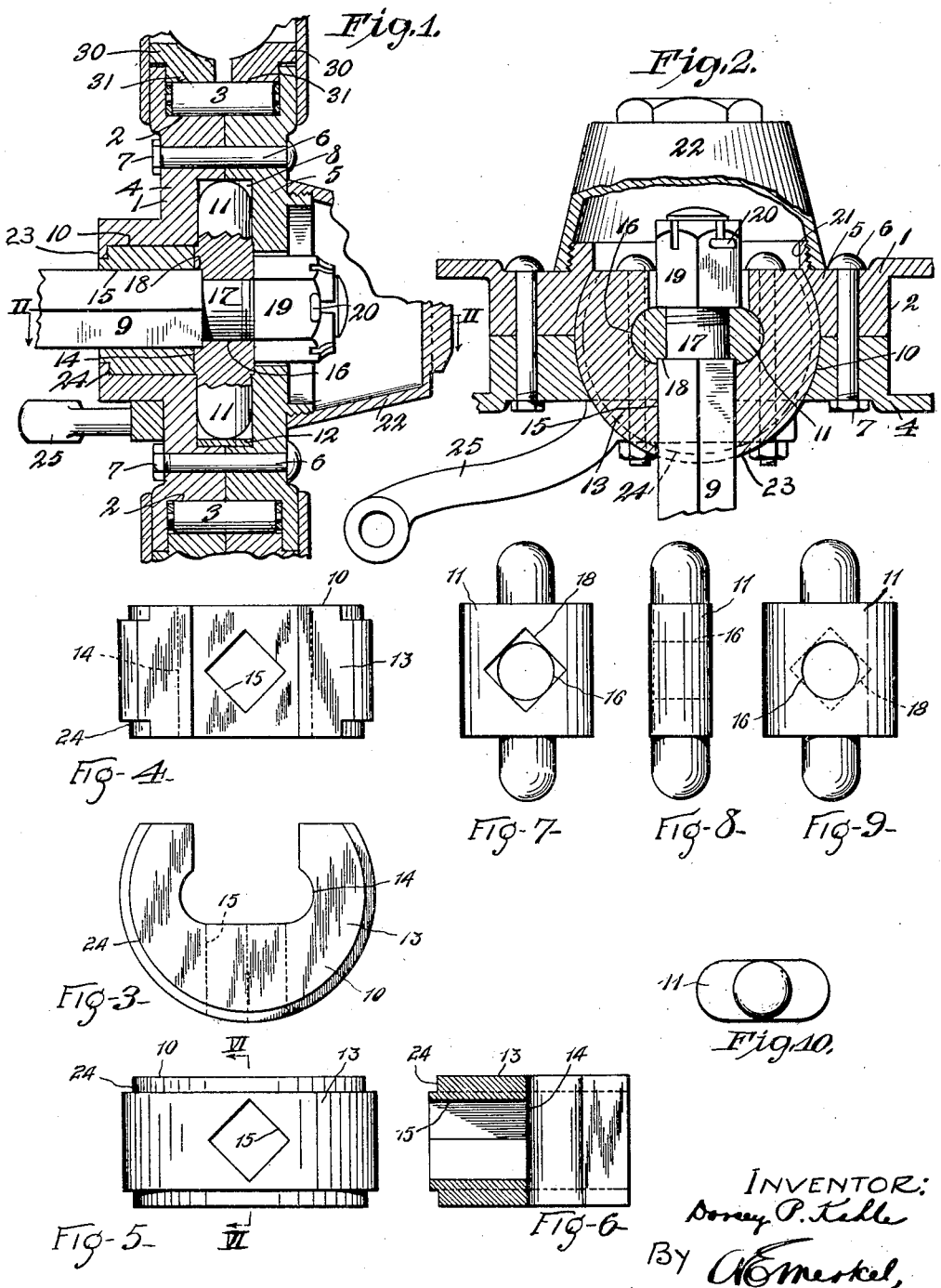

DORSEY P. KAHLE, OF VENUS, PENNSYLVANIA.

STEERING MECHANISM FOR WHEELS.

1,324,399.   Specification of Letters Patent.   Patented Dec. 9, 1919.

Application filed August 21, 1916. Serial No. 116,123.

*To all whom it may concern:*

Be it known that I, DORSEY P. KAHLE, a citizen of the United States, resident of Venus, county of Venango, and State of Pennsylvania, have invented a new and useful Improvement in Steering Mechanism for Wheels, of which the following is a specification, the principle of the invention being herein explained and the best mode in which I have contemplated applying that principle, so as to distinguish it from other inventions.

My invention relates to wheel structures of vehicles such as automobiles or the like.

The object of my invention is to provide a structure whereby the wheel may be attached to the axle of the vehicle in a manner such as to promote safety in use and facility of operation, especially as regards the steering of the vehicle.

The said invention consists of means hereinafter fully described and particularly set forth in the claims.

The annexed drawing and the following description set forth in detail certain means embodying my invention, the disclosed means, however, constituting but one of various mechanical forms in which the principle of the invention may be employed.

In said annexed drawing:

Figure 1 represents a vertical transverse section of a fragmentary portion of my improved steering mechanism taken upon a plane passing through the wheel axis;

Fig. 2 represents a transverse axial section of a fragmentary portion of the mechanism, taken upon the plane indicated by the line II—II, in Fig. 1.

Figs. 3, 4, 5 and 6, represent, respectively, a plan view, an elevation from one side, an elevation from a diametrically opposite side, and a transverse vertical section in the plane indicated by the line VI—VI, Fig. 5, of a tertiary journal member, hereinafter more fully described.

Figs. 7, 8, 9 and 10 represent, respectively, an elevation of one face, a side elevation, an elevation of the other face, and a plan view of a secondary journal member, hereinafter more fully described.

The inner part of my improved wheel comprises a primary journal-member 1 which is formed with an outer peripheral raceway 2 for receiving the anti-friction roller bearings 3. This primary journal-member furthermore is constructed of two members 4 and 5 separable upon the median plane of the wheel and bolted together by means of bolts 6 provided with suitable nuts 7. Each of these separable parts is formed with a semi-cylindrical bearing portion which together form a bearing 8 whose axis lies in said median plane and extends in a direction at right angles with respect to the axis of the axle 9. Furthermore, the axis of this bearing lies without a plane which passes through the axle's axis.

The members 4 and 5 of the primary journal-member are furthermore provided with a cylindrical bearing 10 whose cylindrical bearing surface is coaxial with the axis of the bearing 8 and lies in the surface of a cylinder which intersects the two sides of the member 1, as shown in Fig. 2, side openings in the latter member being thus provided. In the bearing 8 is seated a secondary journal-member 11, a suitable bearing plate 12 being provided at the bottom of the bearing 8, for receiving the thrust of the member 11, as shown in Fig. 1. The upper and lower ends of the member 11 are cylindrical, as shown but the intermediate portion has a major dimension, as shown in Fig. 2. Seated in the bearing 10 is a tertiary and cylindrical journal-member 13 provided with a central opening 14 for receiving the enlarged intermediate portion of the journal-member 11, as shown in Fig. 2. This member 13 is also provided with a transverse square hole 15 for receiving the squared end of the axle 9, as shown in Fig. 1, and journal-member 11 is provided with a cylindrical hole 16 through which passes the cylindrical portion 17 of said axle. The member 11 is preferably also provided with a squared recess 18 for receiving the end or shoulder of the said axle. It will thus be seen that the secondary and tertiary journal-members are fixed relatively to the axle by means of a suitable nut 19. This nut is made of sufficient dimension to project laterally in the member 5, as shown in Fig. 1 and is secured in place by means of a cotter pin 20.

This member 5 is furthermore provided with a boss 21 whose outer surface is threaded to receive the threads of a dust cap 22.

The member 4 is furthermore provided with flanges 23 which fit into the annular recess 24 formed in the outer end of the teritary member 13, thus providing means for excluding dust from the adjacent surfaces of the bearing 10 and member 13, as will be readily understood.

The member 1 is furthermore provided with an integral and laterally extending steering arm 25, Fig. 2.

Assuming the primary journal-member 1 and its attached parts to have been removed from the wheel, the parts thus far described are dismounted as follows:

The dust cap is first unscrewed, whereby access to the nut 19 is obtained. The cotter pin 20 having been removed, and the nut removed from the portion 17 of the axle, it will be seen that the latter may be withdrawn from the secondary and tertiary journal-members. By now unscrewing the nuts 7 and removing the bolts 6, the parts 4 and 5 may be separated, after which the secondary journal-member 11 may be pushed through the hole 14 and then removed. This leaves the tertiary journal-member 13 free to be slipped off the axle.

The inner annular portion of the wheel proper includes in its structure two annular rings 30, 30, Fig. 2, separable upon the median plane previously referred to and provided with inner bearing surfaces 31 for engaging the anti-friction rollers 3.

From the above-described structure it will be seen that by placing the axis of the secondary journal-member 11 ahead of the vertical plane passing through the axis of the wheel, an effect which may be described as the "caster" effect is obtained, that is, the wheel tends to center itself or keep itself in alinement, thus largely removing the strain in the steering operation and also permitting the vehicle to travel in a straight line, for a time at least, should the steering connections break.

Having fully described my invention, what I claim and desire to secure by Letters Patent is:—

1. The combination of a primary journal-member; a wheel rotatably mounted upon the latter, said journal-member being provided with a bearing having an axis extending in a direction at right angles with respect to the axis of the journal-member and with an additional and enlarged bearing coaxial with said first-named bearing, the cylindrical bearing surface of the enlarged bearing lying in the surface of a cylinder intersecting opposite sides of the primary journal member; a secondary journal-member mounted within said first-named bearing; and a tertiary journal member mounted in the enlarged bearing, said secondary journal member being fixed relatively to said tertiary journal member, said tertiary member adapted to be secured to an axle.

2. The combination of a primary journal-member; a wheel rotatably mounted upon the latter, said journal-member being provided with a bearing having an axis extending in a direction at right angles with respect to the axis of the journal-member and with an additional and enlarged bearing coaxial with said first-named bearing, the cylindrical bearing surface of the enlarged bearing lying in the surface of a cylinder intersecting opposite sides of the primary journal member; a secondary journal-member mounted within said first-named bearing; and a tertiary journal member mounted in the enlarged bearing, said secondary journal member located in and passing through an opening in said tertiary journal member, said tertiary member adapted to be secured to an axle.

3. The combination of a primary journal-member; a wheel rotatably mounted upon the latter, said journal-member being provided with a bearing having an axis extending in a direction at right angles with respect to the axis of the journal-member and with an additional and enlarged bearing coaxial with said first-named bearing, the cylindrical bearing surface of the enlarged bearing lying in the surface of a cylinder intersecting opposite sides of the primary journal-member; a secondary journal-member mounted within said first-named bearing and having an enlarged intermediate portion; a tertiary journal-member mounted in said enlarged bearing and provided with a central opening for receiving the enlarged portion of said secondary journal-member; an axle provided with a squared portion; said tertiary member being formed with a hole adapted to receive said axle portion, a cylindrical portion of said axle intersecting said secondary journal member; and means for fixing said secondary journal member relatively to said tertiary member.

Signed by me this 17th day of August, 1916.

DORSEY P. KAHLE.